(12) United States Patent
Harraβ et al.

(10) Patent No.: US 9,945,078 B2
(45) Date of Patent: Apr. 17, 2018

(54) PLASTIC DOWEL FOR FASTENING OF A RAIL AND COMBINATION OF SUCH A PLASTIC DOWEL AND A RAIL SCREW

(71) Applicant: Vossloh-Werke GmbH, Werdohl (DE)

(72) Inventors: Michael Harraβ, Wuppertal (DE); Nikolaj Krieg, Hagen (DE); Martin Gnaczynski, Plettenberg (DE); Adrian Bednarczyk, Ludenscheid (DE); Dietmar Becker, Iserlohn (DE)

(73) Assignee: Vossloh-Werke GmbH, Werdohl (DE)

( * ) Notice: Subject to any disclaimer, the term of this patent is extended or adjusted under 35 U.S.C. 154(b) by 32 days.

(21) Appl. No.: 14/422,515

(22) PCT Filed: Aug. 16, 2013

(86) PCT No.: PCT/EP2013/067171
§ 371 (c)(1),
(2) Date: Feb. 19, 2015

(87) PCT Pub. No.: WO2014/029704
PCT Pub. Date: Feb. 27, 2014

(65) Prior Publication Data
US 2015/0211190 A1    Jul. 30, 2015

(30) Foreign Application Priority Data
Aug. 22, 2012  (DE) .......................... 10 2012 107 732

(51) Int. Cl.
*F16B 37/12* (2006.01)
*E01B 9/02* (2006.01)
(Continued)

(52) U.S. Cl.
CPC ................. *E01B 9/02* (2013.01); *E01B 9/18* (2013.01); *F16B 13/02* (2013.01); *F16B 13/124* (2013.01); *F16B 13/14* (2013.01); *F16B 37/125* (2013.01)

(58) Field of Classification Search
CPC ...... F16B 13/124; F16B 13/14; F16B 37/125; E01B 9/14; E01B 9/16; E01B 9/18
(Continued)

(56) References Cited

U.S. PATENT DOCUMENTS 1,168,770 A * 1/1916 Wagner ................. F16B 13/124
411/80.1
1,227,627 A * 5/1917 Kennedy ............... F16B 37/122
411/178
(Continued)

FOREIGN PATENT DOCUMENTS

BE         496442      10/1950
CN       2871614 Y     2/2007
(Continued)

*Primary Examiner* — Flemming Saether
(74) *Attorney, Agent, or Firm* — The Webb Law Firm

(57) ABSTRACT

The present invention relates to a plastic dowel for the fastening of a rail on a solid substrate. The plastic dowel includes an opening, an interior, a shank section, and a holding section, which provides at least one circumferential projection around its circumference. The at least one projection protrudes in a radial direction whereby the upper flank of the projection of the holding section assigned to the dowel opening is aligned at an angle of 90°±3° in relation to a longitudinal axis of the plastic dowel.

18 Claims, 4 Drawing Sheets

(51) Int. Cl.
*F16B 13/12* (2006.01)
*F16B 13/02* (2006.01)
*E01B 9/18* (2006.01)
*F16B 13/14* (2006.01)

(58) Field of Classification Search
USPC ............ 411/80.1, 80.6, 71, 72, 74, 178, 82; 238/377
See application file for complete search history.

(56) References Cited

U.S. PATENT DOCUMENTS

| | | | | |
|---|---|---|---|---|
| 2,560,951 A | * | 7/1951 | Henderson | F16B 37/122 29/505 |
| 3,143,917 A | * | 8/1964 | Conner | F16B 13/0858 411/271 |
| 3,199,398 A | * | 8/1965 | Weisz | F16B 13/005 411/80.1 |
| 3,834,438 A | * | 9/1974 | Ziaylek, Jr. | B29C 65/645 411/113 |
| 3,921,496 A | * | 11/1975 | Helderman | F16B 19/1081 411/17 |
| 3,937,122 A | * | 2/1976 | Riedel | F16B 13/124 411/34 |
| 4,360,301 A | * | 11/1982 | Mosberger | F16B 13/124 411/73 |
| 4,488,843 A | * | 12/1984 | Achille | F16B 13/126 411/385 |
| 5,131,795 A | * | 7/1992 | Kobusch | B29C 65/645 411/178 |
| 5,641,256 A | * | 6/1997 | Gundy | F16B 13/124 411/180 |
| 5,738,728 A | | 4/1998 | Tisone | |
| 6,406,239 B1 | * | 6/2002 | Mauri | F16B 7/18 411/178 |
| 6,835,038 B2 | * | 12/2004 | Benito-Navazo | F16B 13/061 411/372.5 |
| 8,118,519 B2 | * | 2/2012 | Happel | F16B 13/124 405/135 |
| 8,434,981 B2 | | 5/2013 | Bosterling et al. | |
| 8,814,058 B2 | | 8/2014 | Danneberg et al. | |
| 8,840,036 B2 | * | 9/2014 | Bosterling | F16B 13/02 238/377 |
| 2002/0192051 A1 | | 12/2002 | LeVey et al. | |
| 2012/0038464 A1 | | 2/2012 | Stromberger | |
| 2012/0298765 A1 | | 11/2012 | Boesterling et al. | |
| 2013/0056545 A1 | | 3/2013 | Danneberg et al. | |
| 2013/0228634 A1 | * | 9/2013 | Bosterling | E01B 9/18 238/377 |

FOREIGN PATENT DOCUMENTS

| | | |
|---|---|---|
| DE | 102004004766 A1 | 8/2005 |
| DE | 102011103127 A1 | 12/2011 |
| EP | 0785308 A1 | 7/1997 |
| FR | 2677677 A1 | 7/1996 |
| GB | 2476838 A | 7/2011 |
| TW | 200303962 A | 9/2003 |
| TW | M385613 U1 | 8/2010 |
| TW | M404900 U1 | 6/2011 |
| WO | 2010066837 A1 | 6/2010 |
| WO | 2011147568 A1 | 12/2011 |

* cited by examiner

PLASTIC DOWEL FOR FASTENING OF A RAIL AND COMBINATION OF SUCH A PLASTIC DOWEL AND A RAIL SCREW

CROSS-REFERENCE TO RELATED APPLICATIONS

This application is the United States national phase of International Application No. PCT/EP2013/067171 filed Aug. 16, 2013, and claims priority to German Patent Application No. 10 2012 107 732.0 filed Aug. 22, 2012, the disclosures of which are hereby incorporated in their entirety by reference.

BACKGROUND OF THE INVENTION

Field of the Invention

The invention relates to a plastic dowel for fastening a rail on a solid substrate. In this case, the plastic dowel has a dowel opening formed at an end face of the plastic dowel for insertion of a rail screw into the plastic dowel, with a dowel interior space enclosed by the plastic dowel, with a shank section which connects the dowel opening as viewed in the longitudinal direction of the plastic dowel, and with a holding section which connects to the shank section as viewed in the longitudinal direction of the plastic dowel.

Description of Related Art

The holding section is usually provided with at least one projection protruding in the radial direction on its outer side, which, in the finished installed state, engages with the material of the solid substrate surrounding the plastic dowel. At the same time, the holding section usually has an internal thread on its inner side into which a rail screw can be screwed with its threaded section.

The invention also relates to a combination of a dowel and a rail screw.

In order to meet the requirements imposed on modern rail transport, today tracks for rail vehicles are usually laid as so-called "ballastless tracks" in which the rails of the track are laid on sleepers or slabs cast from concrete. Likewise in conventional ballasted track, sleepers cast from concrete are nowadays usually laid in a ballast bed.

The fastening points provided for the fastening of the rails usually comprise a guide plate supported against the solid substrate formed by the respective sleeper or slab, which acts against the base of the rail and thus guides the rail laterally, a spring element supported on the guide plate, which acts with at least one spring arm on the rail base, which applies to the rail base the holding-down forces directed towards the solid substrate which are required for the elastic holding down of the rail, a dowel let into the solid substrate and a rail screw usually designed as a screw or threaded bolt which is screwed into the dowel and braces the spring element against the solid substrate.

The sleepers or slabs forming the solid substrate are usually cast from concrete or another flowable material. In this case, the dowels required at the respective fastening points are usually cast directly into the material of the solid substrate so that they are aligned with their dowel opening flush with the free upper side of the solid substrate forming the support surface for the rail to be fastened.

The dowel sitting in the respective solid substrate has various functions. On the one hand, it enables the simple fastening of the rail screw. In this case, it bears the tensile forces required for clamping the spring element in the ready mounted rail and guides them into the solid substrate along with the dynamic stresses produced when a rail vehicle travels over the respective rail fastening point.

On the other hand, the dowel serves as an electrical insulator through which the rail screw clamping element usually consisting of conductive steel is electrically insulated with respect to the solid substrate.

At the same time, the dowel should be able to receive different thread forms and be able to be exchanged as simply as possible in the event of its wear.

Finally a dowel of the type in question here should also be constituted so that it can be simply positioned in the correct position during manufacture of the component forming the solid substrate.

Dowels made of plastic of the type described previously are known, for example, from EP 0 785 308 B1 or DE 10 2011 103 127 A1. Making the dowel out of plastic has the advantage that there are only slight restrictions in the shaping of the plastic dowels and also the insulator effect can easily be achieved.

Practical experience has shown that under the high stresses which occur nowadays in the surroundings of the dowel, cracks in the respective solid substrate can occur particularly in a near-surface layer to the support surface of the substrate. These can go as far as destruction of the component forming the respective solid substrate.

It is known that only minimal loads of the surroundings occur in dowels having smooth circumferential surfaces in the installed state. Therefore the shank section adjoining the support surface of the solid substrate in the installed state of plastic dowels of the type in question here usually has a circumferential surface which is smooth, uniformly cylindrical or tapering conically in the direction of the dowel tip.

However, a certain bracing between the cast material (concrete) of the solid substrate and the dowel must be given to absorb the forces required for clamping the spring element at a rail fastening point. This is solved in practice by forming at least one projection on the holding section of the dowel by which means a positive connection of the dowel to the surrounding material of the solid substrate is ensured in the installed state. Thus, dowels are known in which collar-shaped circumferential projections are provided at regular intervals on the holding section in the longitudinal direction of the dowel.

Furthermore, dowels in which the projection provided on the outer side of the holding section is configured as an external thread are widely used. The thread form has the advantage that in the event that the dowel needs to be replaced on account of wear, it can be unscrewed from the receptacle provided for it in the solid substrate in a relatively simple manner in the manner of a screw. The external thread is usually designed so that the tensile forces applied to the dowel via the rail screw screwed into it in the finished installed state can be guided via the flanks of the external thread into the material of the solid substrate surrounding the dowel. Therefore with the plastic dowels configured in the manner explained previously there is always an unavoidable risk that as a result of the stresses occurring in practical use, cracks will occur in the surroundings of the dowel installed in the particular solid substrate.

In DE 10 2011 103 127 A1 stress peaks have been identified as the cause for this crack formation, which are guided via the thread formed on the holding section of the dowel into the adjoining material of the solid substrate. In order to avoid these stress peaks, it is proposed in DE 10

2011 103 127 A1 to give the thread a specific shape, as a result of which a more uniform, larger-area of stress distribution should be achieved.

SUMMARY OF THE INVENTION

Against the background of the previously explained prior art, it is the object of the invention to provide a plastic dowel in which the risk of the formation of near-surface cracks within the solid substrate is minimized in the finished installed state.

Furthermore, a combination of a rail screw and a plastic dowel is to be provided in which the risk of crack formation is also reduced to a minimum in the installed state.

According to the invention for the fastening of a rail on a solid substrate in agreement with the prior art given initially in each case comprises a dowel opening formed at an end face of the plastic dowel for introducing a rail screw into the plastic dowel. Furthermore, a plastic dowel according to the invention in each case comprises a dowel interior space enclosed by the plastic dowel and a dowel tip configured on the other end face of the plastic dowel as viewed in the longitudinal direction.

Likewise, a plastic dowel according to the invention in each case comprises a shank section which adjoins the edge surrounding the dowel opening of the plastic dowel when viewed in the longitudinal direction of the plastic dowel.

Furthermore, a plastic dowel according to the invention in each case comprises a holding section which adjoins the shank section when viewed in the longitudinal direction of the plastic dowel.

According to the first embodiment of the invention, at least one circumferential projection around the circumference of the holding section is provided on the outer side of the holding section, which protrudes in the radial direction which in the finished installed state engages with the material of the solid substrate surrounding the plastic dowel.

In the second embodiment of the invention, the holding section is provided with an internal thread on its inner side assigned to the dowel interior.

According to the first embodiment of the invention, the threaded flank of the at least one projection of the holding section of the plastic dowel assigned to the thread opening is aligned at an angle of 90°±3° in relation to the longitudinal axis of the plastic dowel.

According to the second embodiment of the invention, the inner circumferential surface of the shank section of the plastic dowel is configured to be flat and an internal thread is formed in the region of the holding section of the plastic dowel, of which the threaded flank assigned to the dowel opening is aligned at an angle of 90°±3° in relation to the longitudinal axis of the plastic dowel.

Both embodiments of the invention contribute to a minimisation of the input of transverse forces and stress peaks into the surroundings of the dowel in the case of a dowel let into the respective solid substrate in each case taken by itself. Therefore each of the embodiments of the invention in each case taken by itself solves the object specified in relation to a plastic dowel provided for the rail fastening. An optimal effect of the invention then occurs if both embodiments of the invention are implemented simultaneously on the plastic dowel according to the invention if therefore the shank section is configured to be flat both on its outer and on its inner side and both on the outer side of the holding section, a projection preferably configured as an external thread and also an internal thread are provided on the inner side of the holding section, where the flanks both of the projection present on the outer side and of the internal thread formed on the inner side assigned to the dowel opening enclose an angle of 90°±3° with the respectively adjoining wall surface of the holding section aligned axially parallel to the longitudinal axis of the plastic dowel.

Both embodiments of a plastic dowel according to the invention are based on the finding that the introduction of transverse forces and stress peaks into the material of the solid substrate surrounding the plastic dowel in the installed state can be reduced to a minimum by means of a suitable alignment, in relation to the longitudinal axis of the plastic dowel, of the flank of the projection or thread (radially projecting projection or external thread and/or internal thread of the holding section) provided in the respective holding section, assigned to the dowel opening. The more exactly the flanks of the respective projection or thread facing the dowel opening are aligned at a right angle in relation to the longitudinal axis of the plastic dowel, the less the surroundings of the dowel are exposed to stresses which, in the installed state, extend in the radial direction away from the plastic dowel into the solid substrate.

If the flank of the respective thread or projection assigned to the dowel openings is aligned exactly at an angle of 90° in relation to the dowel longitudinal axis, in the radial direction no more forces can be guided via this flank into the surrounding material of the solid substrate. Accordingly, in such an arrangement the fraction of the tensile forces which in the installed state are applied by the rail screw screwed into the plastic dowel and guided via the flank of the respective thread assigned to the dowel opening in the radial direction into the surroundings of the dowel is "0".

Therefore an advantageous embodiment of the invention provides that the dowel flank assigned to the dowel opening is in each case aligned at an angle of 90°±1°, in particular exactly at 90° in relation to the longitudinal axis of the plastic dowel. In this case, in particular in relation to the projection provided on the outer side of the holding section of the plastic dowel, in particular configured as an external thread, it can be expedient for production technology reasons to restrict the range of the angle at which the flank of the projection assigned to the dowel opening is aligned in relation to the longitudinal axis of the plastic dowel to 90-91° within the scope of the production tolerances in order to avoid undercuts.

In a plastic dowel according to the invention, the projection provided on the outer side of the holding section, in particular configured as an external thread, and the internal thread provided on the inner side of the holding section are therefore in each case formed so that in the installed state not only in the region of the in particular flat upper shank section of the plastic dowel but also in the region of the holding section, at best minimal stressing of the material of the solid substrate surrounding the plastic dowel by radially propagating stresses is obtained. In consequence in the region of the holding section configured according to the invention there is at least still a minimal risk that cracks will form.

The length region of the dowel in which minimal stressing of the surroundings of the dowel occurs in practical usage is therefore lengthened by an appreciable amount with the invention. At the same time, the plastic dowel in the installed state is already clamped positively with the solid substrate by material in the holding section.

In order to improve the security of the anchoring of the plastic dowel shaped according to the invention in the respective solid substrate, when viewed in the longitudinal direction of the plastic dowel, a second holding section can adjoin the first holding section in which the at least one projection provided on the outer side of the holding section or the external thread provided as a projection on the outer side of the holding section and the respective internal thread of the holding section are continued.

In this case, the threaded flank of the projections provided on the outer side or of the external thread and of the internal thread assigned to the dowel opening in the threaded section is disposed or rounded out at an angle of more than 93° with respect to the longitudinal axis of the plastic dowel.

"Rounded out" here means that the flank of the projections provided on the threaded section or of the thread formed there assigned to the dowel opening goes over, when viewed in the radial direction, in a continuously curved profile into the flank of the respective projection or thread assigned to the dowel tip.

For production technology reasons or to avoid the notch effect on the plastic dowel according to the invention, the transition between the flank of the projection provided on the outer side of the respective holding section or the internal thread assigned to the dowel opening and the associated outer or inner circumferential surface of the plastic dowel aligned axially parallel to the longitudinal axis of the plastic dowel can be configured to be rounded. That is, the flank of the at least one projection (external thread) provided on the holding section, associated with the dowel opening can go over into the circumferential wall of the dowel aligned in the longitudinal direction of the plastic dowel. In the same way, the transition between the flank of the internal thread of the holding section associated with the dowel opening and the inner circumferential surface of the holding section aligned in the longitudinal direction of the plastic dowel can be rounded or beveled.

The shaping of the flank of the external projection assigned to the dowel tip can also be designed in such a manner that via this flank only minimal forces are guided in the radial direction from the dowel into the surrounding material of the solid substrate. The lower flank can thus be aligned obliquely in the direction of the dowel tip or configured to be curved convexly outwards.

In precisely the same way, the flank of the internal thread of the holding section assigned to the dowel tip can be selected depending on the shape of the thread formed on the threaded shank of the rail screw and the greatest possible compatibility with different thread shapes. Here it has proved to be practical if the flank of the projection (external thread) provided on the outer side of the holding section associated with the dowel tip or internal thread of the first holding section is convexly curved in each case.

The stresses introduced into the surroundings of the plastic dowel according to the invention in the region of the second holding section in the installed state can be homogenised whereby when viewed in longitudinal section, the transition between the flank of the projection or the internal thread of the second holding section assigned to the dowel opening to the flank of the relevant projection or internal thread assigned to the dowel tip is rounded as a convexly curved continuous curve. In particular as a result of the rounded shape of the projection provided on the outer side of the second holding section, high pull-out forces of the dowel can be achieved in the installed state since by far the largest proportion of the total tear-out resistance of a cast dowel lies in deeper regions of the solid substrate.

The stresses introduced into the surrounding material of the solid substrate in the installed state in the region of the first plastic dowel configured according to the invention can be further reduced whereby on the outer side of the plastic dowel in the region of the first holding section there is formed at least one web which adjoins the step section and extends in the longitudinal direction of the plastic dowel, whose width in its substrate region corresponds to at least a fifteenth, in particular at least a twelfth, of the circumference of the plastic dowel, which crosses the projection (external thread) of the first holding section and whose apex surface when viewed in the radial direction extends at least as far as the imaginary extension of the envelope of the step section. The width of the web provided in each case is optimally restricted to a maximum of a quarter of the circumference of the plastic dowel in its substrate region.

The relevant web extending in the longitudinal direction of the plastic web with its apex surface forms an extension of the smooth circumferential surface of the shank section without the positive bracing between the solid substrate and the first holding section of the plastic dowel being substantially adversely affected as a result. Preferably at least two or more webs which are distributed at the same angular distances about the longitudinal axis of the plastic dowel are provided in each case for this purpose.

According to the invention therefore, only small transverse forces act on the surrounding concrete in the region of the first holding section adjoining the shank section as a result of the shaping according to the invention of the projection provided on the outer side thereof, configured in particular as an external thread, and the outer surfaces of the optionally provided webs which are smooth on both sides and which are aligned at right angle to the sleeper longitudinal axis in the installed state. In a dowel according to the invention therefore, transverse forces are not transferred into the solid substrate distributed rotationally symmetrically around the dowel but are guided specifically in one direction in which the material of the solid substrate can reliably absorb these stresses for example as a result of the reinforcements let into the solid substrate.

In corresponding manner in the region of the first threaded section one or more groove-shaped recesses extending in the longitudinal direction of the plastic dowel can be formed in the circumferential surface assigned to the dowel interior. These grooves interrupt the radially extending stresses transmitted via the internal thread and thus also lead to a reduction of the stressing of the surroundings of the plastic dowel according to the invention in the installed state. In the event that the previously explained webs are formed on the outer side of the plastic dowel, a weakening of the dowel can be avoided whereby the respective groove is formed in the region of the respectively assigned web provided on the outer side of the plastic dowel.

In a combination according to the invention of a rail screw and a plastic dowel configured according to the invention, the rail screw has a screw head and a threaded shank following the screw head in the longitudinal direction of the rail screw, on which a circumferential screw thread is formed. According to the invention, this is characterised in that the threaded flank of the screw thread assigned to the screw head is aligned at an angle of 90°±3° relative to the longitudinal axis of the rail screw. Consequently, the rail screw used in a combination according to the invention transmits only minimal forces in a radial direction directed radially away from the longitudinal axis of the plastic dowel. Optimally to this end, the threaded flank of the screw thread assigned to the screw head is aligned as exactly as possible at a right angle in relation to the longitudinal axis of the rail screw. Accordingly, the invention provides that the threaded flank of the rail screw associated with the screw head is aligned at an angle of 90°±max. 1° relative to the longitudinal axis of the rail screw within the limits of manufacturing tolerances.

A particularly important embodiment of the invention for practical use consists in that the core diameter of the rail screw, at least in the region in which the screw thread is provided, decreases in the direction of the screw tip, where the diameter of the screw thread remains constant over the entire length of the threaded shank, i.e. in the radial direction extends continuously as far as a cylindrically configured envelope of the threaded shank. Preferably to this end the core of the rail screw tapers conically in the direction of the screw tip.

The tapering shape of the threaded core of the rail screw in the direction of the screw tip has the advantage that when the rail screw is screwed into the plastic dowel a free space remains in the region of the thread pitches between the core of the screw and the inner wall of the plastic dowel in which dirt can collect without hindering the screwing in and out of the rail screw.

In a combination of rail screw and plastic dowel according to the invention, the thread of the screw and the internal thread of the dowel are therefore optimised with respect to one another in such a manner that as a result of the almost right-angled transition from the screw core onto the thread flanks under axial tensile loading in the screw, a tensile force acting almost exclusively in the screw axis is produced and therefore transverse and tangential forces at right angles to the screw in the direction of the dowel wall and furthermore into the material of the solid substrate surrounding the dowel are severely reduced. At the same time, the formation of the internal thread of the plastic dowel according to the invention has the effect that on the one hand only small transverse forces can be received via the thread flanks and on the other hand, there is no contact between dowel wall and screw core with the result that transmission of force (pressing) of screw to dowel wall is also prevented.

Since the ratio of the screw diameter to the diameter of its core is larger towards the lower end of the screw, a free volume between screw and dowel up to 50% larger compared with conventional screw/dowel combinations is achieved in the region of the dowel interior, with the result that impurities entering into the dowel (e.g. sand) during mounting/dismounting of the rail fastening system cause less damage during renewed screwing. Furthermore, the tapering shape of the screw core allows a corresponding tapering of the interior of the dowel in the direction of the dowel tip so that if the outside diameter of the dowel remains the same, a larger contact/overlap surface between the material of the solid substrate and the plastic dowel according to the invention is achieved. As a result, this contributes to the increase in the pull-out resistance.

A shank section whose circumferential surface is configured to be smooth can also be provided on the rail screw used according to the invention in order to reduce stresses transmitted in the radial direction in this region, where preferably the envelope of the circumferential surface of the shank section coincides with the cylindrical envelope of the thread section of the rail screw.

BRIEF DESCRIPTION OF THE DRAWINGS

The invention is explained in detail hereinafter with reference to exemplary embodiments. In the figures.

DETAILED DESCRIPTION OF THE INVENTION

Figure 1:
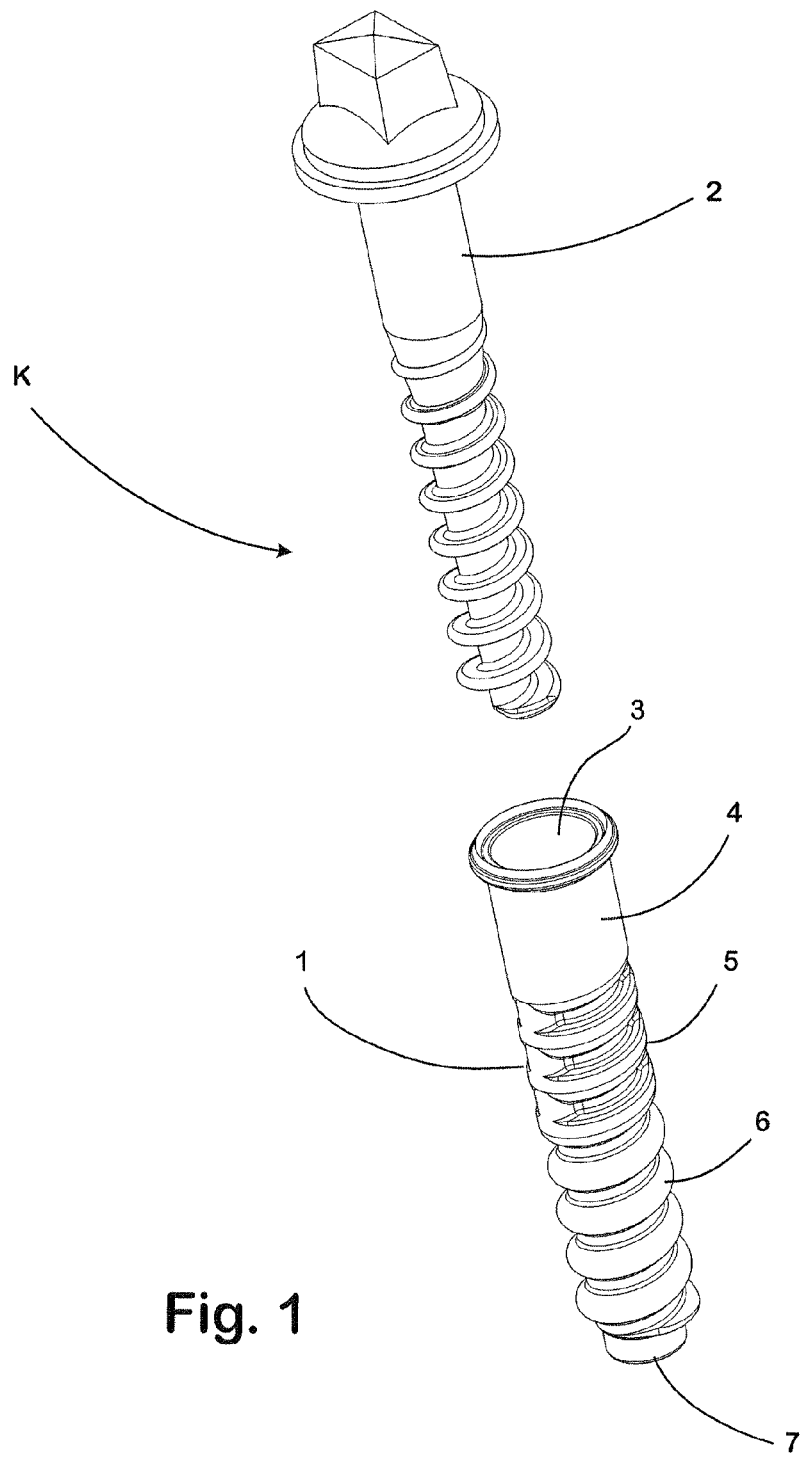
FIG. 1 shows a screw-plastic dowel combination in a perspective exploded view.
Figure 2:
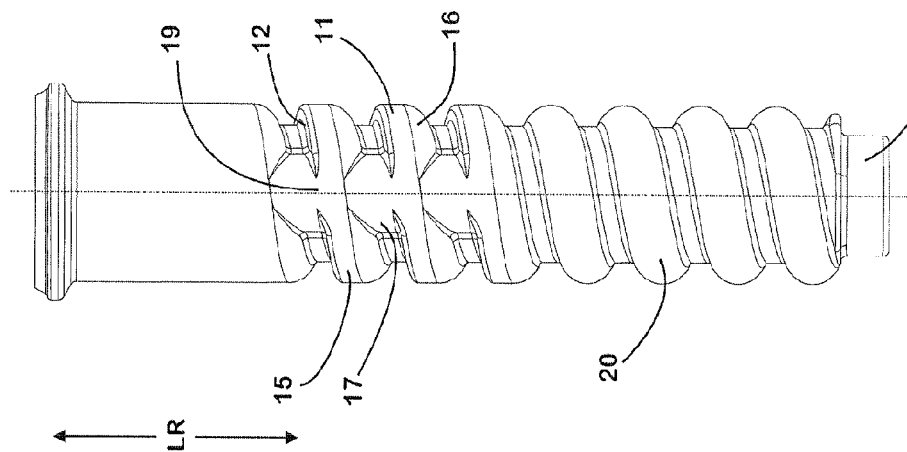
FIG. 2 shows the plastic dowel of the screw-plastic dowel combination in perspective view.
Figure 3:
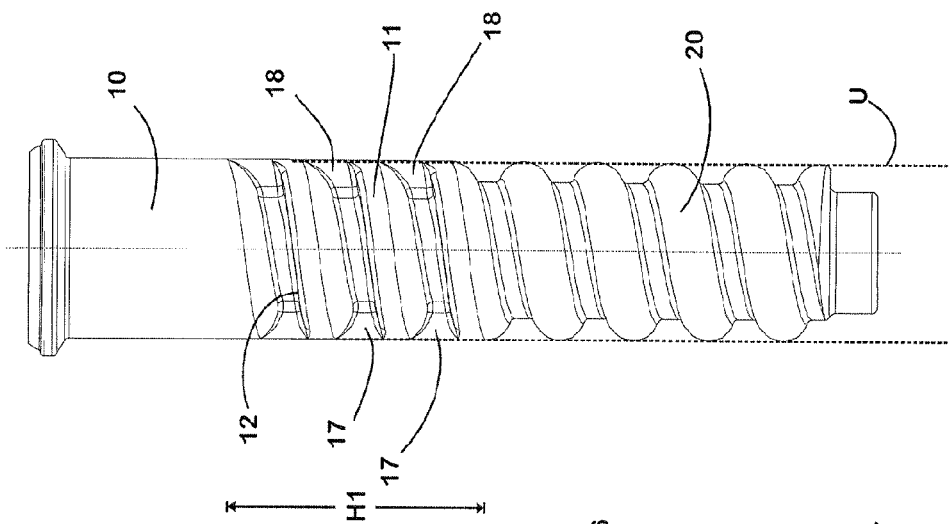
FIG. 3 shows the plastic dowel in a first side view.
Figure 5:
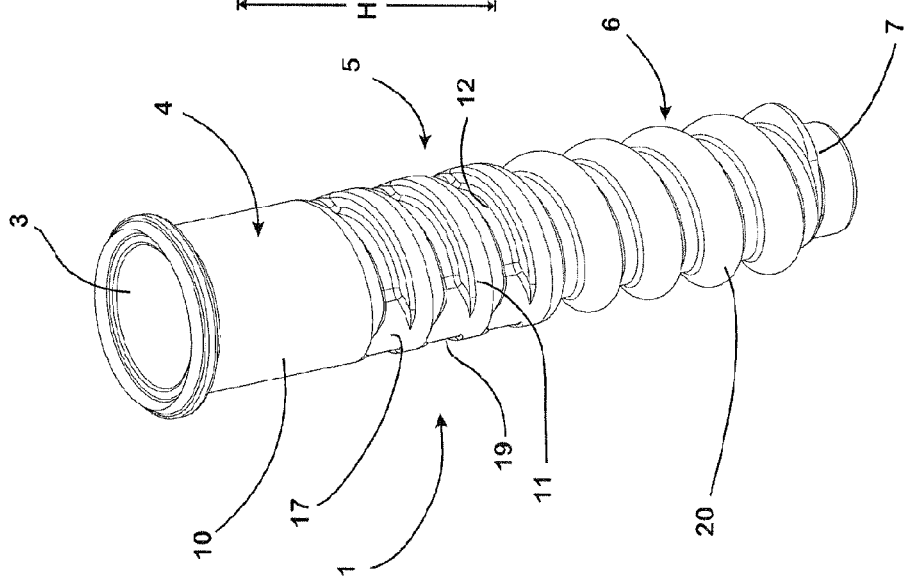
FIG. 5 shows the plastic dowel in a position rotated through 90° about the longitudinal axis of the plastic dowel compared with the view in FIG. 3 in side view.

The screw-plastic dowel combination K comprises a plastic dowel 1 and a rail screw 2 made from a steel in a conventional manner.

The plastic dowel 1 has a dowel opening 3 delimited by an edge configured in the manner of a collar, a shank section 4 which adjoins the dowel opening 3 in the longitudinal direction LR of the plastic dowel 1, a first holding section 5 which follows the shank section in the longitudinal direction LR of the plastic dowel 1, a second holding section 6 which adjoins the first holding section 5 in the longitudinal direction LR, a dowel tip 7 and a dowel interior 8 which is delimited by the shank section 4 and the holding sections 5, 6. A through-opening 9 aligned coaxially to the longitudinal axis L of the plastic dowel 1 is formed in the dowel tip 7, via which moisture entering into the plastic dowel 1 can flow out.

The outer circumferential surface 10 of the shank section 4 is configured to be cylindrical and smooth so that the circumferential surface 10 coincides with the cylindrical envelope U of the shank section 4.

A projection 11 in the form of an external thread is formed on the first holding section 5, which projection runs around the first holding section 5 in a uniform pitch starting from the boundary between the shank section 4 and the first holding section 5 in the direction of the dowel tip 7. The projection 11 here has an upper flank 12 assigned to the dowel opening 3, which is aligned at an angle β1 of 90° relative to the longitudinal axis L. Accordingly the upper flank 12 encloses the same right angle β1 with the adjoining circumferential wall surface 13 of the plastic dowel 1 aligned axially parallel to the longitudinal axis L. For production technology reasons and in order to avoid a notch effect, the transition 14 between the upper flank 12 and the relevant wall surface 13 is rounded in the manner of a throat.

At its free edge facing away from the circumferential wall surface 13, the upper flank 12 of the projection 11 adjoins an apex surface 15 of the projection 11 which is aligned substantially axially parallel to the longitudinal axis L of the plastic dowel 1. The apex surface 15 here also lies on the cylindrical envelope U of the shank section 4.

The lower flank 16 of the projection 11 assigned to the dowel tip 7 adjoins the apex surface 15. The lower flank 16 of the projection 11 is convexly outwardly rounded here and goes over in a rounded throat into the circumferential wall surface 13 of the plastic dowel 1.

In the region of the holding section 5 the projection configured in the manner of an external thread is interrupted by two webs 17, 18 which extend opposite to one another as an extension of the shank section 4 of the height H1 of the first holding section 5. The webs 17, 18 have a width in their base region which corresponds to approximately 14% of the circumference of the shank section 4. The webs 17, 18 are outwardly curved in a semicircular shape in cross-section, the webs being flattened in their apex region 19 according to the radius of the envelope U. The apex region 19 also lies on the envelope U of the shank section 4 so that the apex region 19 of the webs 17, 18 goes over into the circumferential surface 10 of the shank section 4 in a smooth manner.

In the region of the second holding section 6 the projection 11 of the first holding section 5 configured as an external thread is continued as projection 20 which is also configured as a rounded external thread. Accordingly, the flank of the external thread projection 20 assigned to the dowel opening 3 goes over in a continuous convex outwardly curved curve into the apex region of the projection 20 which in the same way goes over into the flank of the external thread projection 20 associated with the dowel tip 7. In this case, the apex of the projection 20 lies on the cylindrical envelope of the plastic dowel 1.

An internal thread 21 is formed in the inner circumferential surface 23 of the plastic dowel 1 which extends over the first and the second holding section 5, and is formed in the same shape over both holding sections 5, 6.

The upper flank 22 of the internal thread 21 assigned to the dowel opening 3 is in this case aligned at an angle β2 of 90o in relation to the longitudinal axis L of the plastic dowel 1 so that the upper flank 22 encloses the same right angle β2 with the inner circumferential surface 23 of the plastic dowel 1 aligned axially parallel to the longitudinal axis L. The transition 24 between the inner circumferential surface 23 and the upper flank 22 of the internal thread 21 is also rounded here.

At the same time, the upper flank 22 goes over into a continuously convex outwardly curved apex region 25 which is in turn adjoined by a concavely curved lower flank 26 assigned to the dowel tip 7. The lower flank 26 runs out smoothly into the inner circumferential surface 23 of the plastic dowel 1.

Figure 4:
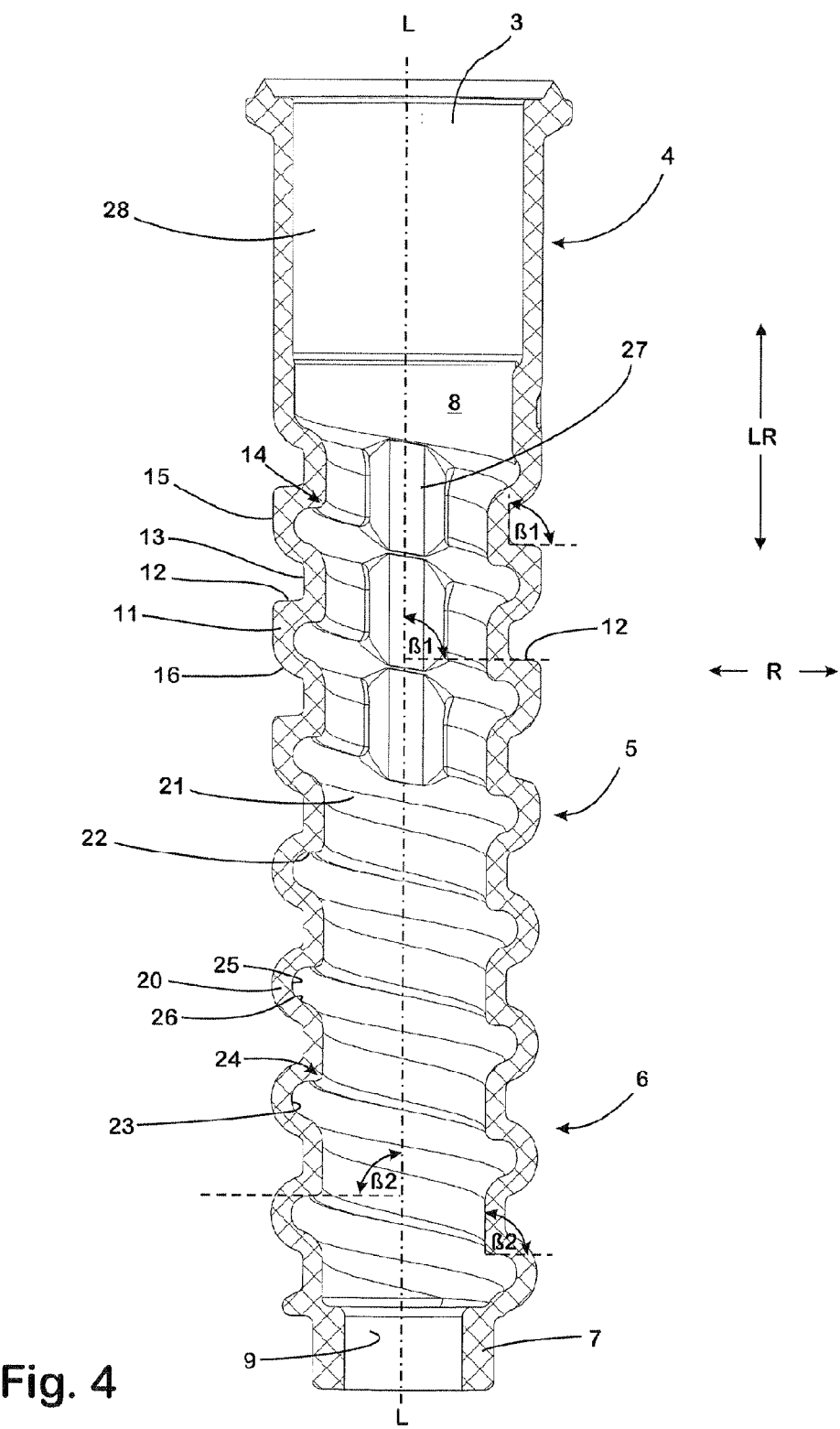
FIG. 4 shows the plastic dowel in a longitudinal section along the line of intersection A-A shown in FIG. 3.
Figure 8:
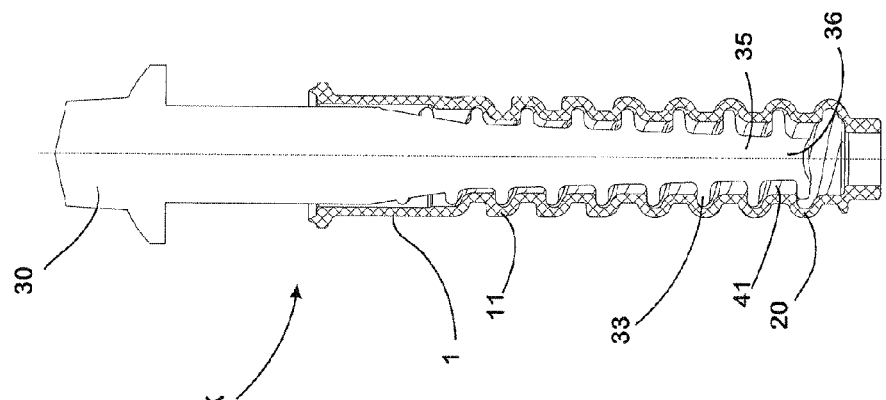
FIG. 8 shows the screw-plastic dowel combination with rail screw inserted in the plastic dowel and plastic dowel shown in longitudinally cutaway view.
Figure 7:
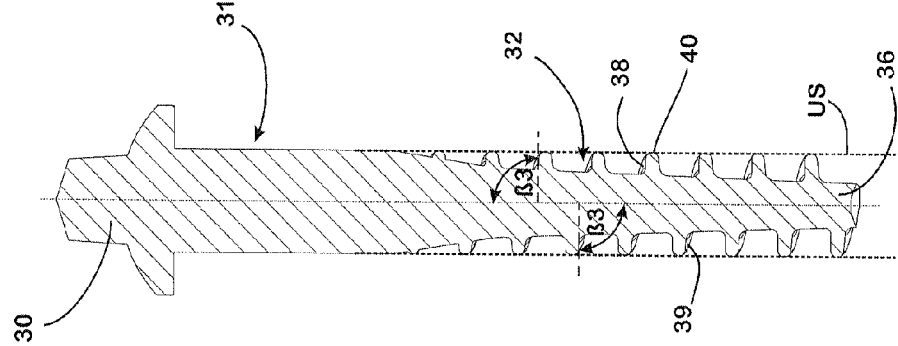
FIG. 7 shows the rail screw according to FIG. 6 in a longitudinal section.
Figure 6:
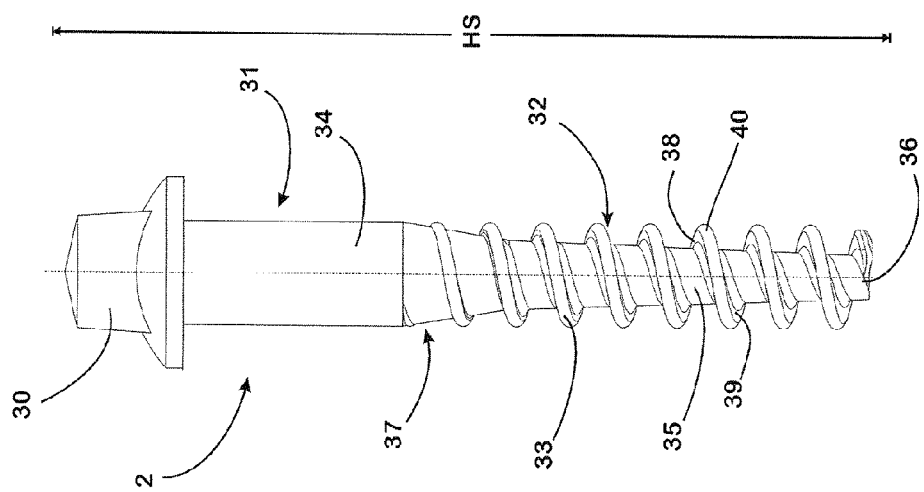
FIG. 6 shows the rail screw of the screw-plastic dowel combination in side view.

In the region of the first holding section 5, the internal thread 21 is interrupted by groove-shaped recesses 27 which extend opposite to the webs 17, 18 on the inner side of the plastic dowel 1 via the height H1 of the first holding section 5. Of the recesses 27 only the recess 27 assigned to the web 18 can be seen as a result of the selected view in FIG. 4. Like the webs 17, 18 the recesses 27 also contribute, in the sense of a lengthening of the smooth inner circumferential surface of the shank section 4, to the minimizing of the spread of transverse forces starting from the first holding section 5 into the solid substrate surrounding the plastic dowel 1 in the installed state.

The shape and dimensions of the upper flank 22, the apex region 25 and the lower flank 26 of the internal thread 21 are designed so that rail screws 2 having differently shaped threads can be screwed into the plastic dowel 1.

Preferably however a rail screw 2 of the type described here is used in the screw-plastic dowel combination K. Such a rail screw 2 has a screw head 30, a shank section 31 connected to the screw head 30 in the longitudinal direction LR of the rail screw 2 and a thread section 32 connected to the shank section 31 in the longitudinal direction LR which carries an external thread 33.

The cylindrically shaped shank section 31 has a smaller diameter than the screw head 30 and a smooth circumferential surface 34 in a manner known per se. It extends over about 24% of the height HS of the rail screw 2.

In the region of the thread section 32 the core 35 of the rail screw 2 tapers in the direction of the tip 36 of the rail screw 2. At the same time, in an upper region 37 adjoining the shank section 31 which occupies about a quarter of the length of the thread section 32, the core 35 initially tapers conically with a greater pitch before tapering conically in the direction of the screw tip 36 with uniform pitch over the remaining length of the thread section 32.

The upper flank 38 of the external thread 33 assigned to the screw head 30 and also the lower flank 39 of the external thread 33 assigned to the screw tip 36 are each aligned at an angle 133 of 90o in relation to the longitudinal axis L of the rail screw. At the same time, the apex region 40 of the external thread 33 connecting the flanks 38, 39 describes a convexly outwardly curved semicircle. The apex of the apex region 40 in this case lies on the cylindrical envelope US of the shank section 31 of the rail screw 2.

As a result of the core 35 tapering conically in the direction of the screw tip 36, when the rail screw 2 is screwed into the plastic dowel 1 an enlarged empty space 41 is formed in the lower region of the dowel interior 8 assigned to the dowel tip 7 in which dirt entering into the plastic dowel 1 can enter without hindering the screwing in and out of the rail screw 2.

The shaping according to the invention has the result that in the installed state in the region of the first holding section 5, forces aligned at most to a minimal extent transversely to the longitudinal axis L of the plastic dowel 1 are guided away from the plastic dowel in the radial direction R into the material surrounding the plastic dowel 1 of the solid substrate accommodating the plastic dowel 1. Accordingly the risk of the formation of cracks in this region is minimised in the same way as in the region of the shank section 4 over the smooth circumferential surface 10 whereof no transverse forces are guided into the material surrounding the plastic dowel 1.

REFERENCE LIST

1 Plastic dowel
2 Rail screw
3 Dowel opening
4 Shank section of plastic dowel 1
5 First holding section of plastic dowel 1
6 Second holding section of plastic dowel 1
7 Dowel tip of plastic dowel 1
8 Dowel interior of plastic dowel 1
9 Through opening of dowel tip 7
10 Outer circumferential surface of shank section 4
11 Projection formed as external thread on the outer side of the first holding section 5
12 Upper flank of projection 11
13 Circumferential wall surface of plastic dowel 1
14 Transition between the upper flank 12 and the circumferential wall surface 13
15 Apex surface of projection 11
16 Lower flank of projection 11
17, 18 Webs
19 Respective apex region of webs 17, 18
20 Projection of second holding section 6 configured as rounded external thread
21 Internal thread of plastic dowel 1
22 Upper flank of internal thread 21 assigned to dowel opening 3
23 Inner circumferential surface of plastic dowel 1
24 Transition between the inner circumferential surface 23
25 Apex region of internal thread 21

26 Lower flank of internal thread 21 assigned to dowel tip 7
27 Groove-shaped recesses
28 Smooth inner circumferential surface of shank section 4
30 Screw head of rail screw 2
31 Shank section of rail screw 2
32 Threaded section of rail screw 2
33 External thread of rail screw 2
34 Circumferential surface of shank section 31
35 Core of rail screw 2
36 Tip of rail screw 2
37 Region of threaded section 31 adjoining step section 31
38 Upper flank of external thread 33 assigned to screw head 30
39 Lower flank of external thread 33 assigned to screw tip 36
40 Apex region of external thread 33
41 Empty space in plastic dowel 1 when screw is screwed in
H1 Height of first holding section 5
HS Height of rail screw 2
K Screw-plastic dowel combination
L Longitudinal axis of plastic dowel 1
LR Longitudinal direction
R Radial direction
β1 Angle enclosed between the longitudinal axis L or the circumferential wall surface 13 aligned coaxially to the longitudinal axis L and the upper flank 12 of the projection 11
β2 Angle enclosed between the longitudinal axis L or the inner circumferential surface 23 of the plastic dowel 1 aligned coaxially to the longitudinal axis L
β3 Angle at which the upper and the lower flank 38, 39 of the external thread 33 are each aligned in relation to the longitudinal axis LS of the rail screw 2
U Cylindrical envelope U of the shank section 4 and the holding sections 5, 6
US Envelope of the shank section 31

The invention claimed is:

1. A plastic dowel for fastening a rail on a solid substrate, with a dowel opening formed at an end face of the plastic dowel for insertion of a rail screw into the plastic dowel, with a dowel interior space enclosed by the plastic dowel, with a shank section which connects to the dowel opening of the plastic dowel, and with a holding section which connects to the shank section of the plastic dowel and which is provided on an outer side with at least one projection running around its circumference and protruding in a radial direction which, in a finished installed state, engages with a material of the solid substrate enclosing the plastic dowel, wherein the projection of the holding section is formed as an external thread and an upper flank of the projection of the holding section is orientated at an angle of 90°±3° in relation to a longitudinal axis of the plastic dowel,
wherein the dowel has an internal thread on an inner side, and a flank of the internal thread is orientated at an angle of 90°±3° in relation to the longitudinal axis of the plastic dowel.

2. The plastic dowel according to claim 1, wherein an inner circumferential face or outer circumferential face of the shank section is smooth.

3. The plastic dowel according to claim 1, wherein a second holding section connects to a first holding section of the plastic dowel, in said second holding section also at least one radially outwardly protruding projection is formed or a respective internal thread is continued, and in that a flank of the projection or of the internal thread in the second holding section is arranged at an angle of more than 93° in relation to the longitudinal axis of the plastic dowel or is rounded.

4. The plastic dowel according to claim 1, wherein the upper flank in a first holding section is orientated in each case at an angle of 90°±1° in relation to the longitudinal axis of the plastic dowel.

5. The plastic dowel according to claim 1, wherein a transition from an underside of a flank of the projection or of an upper flank of the internal thread to a respectively assigned circumferential face of the plastic dowel has a rounded form.

6. The plastic dowel according to claim 1, wherein a lower flank of the projection or of the internal thread has a convex domed form.

7. The plastic dowel according to claim 1, wherein a transition from an underside of the upper flank of the projection or of an upper flank of the internal thread of a second holding section to the flank of an associated projection or of a second holding section to the internal thread has a rounded form.

8. The plastic dowel according to claim 1, wherein on an outer side of the plastic dowel in the area of a first holding section at least one web connected to the shank section and extending in a longitudinal direction of the plastic dowel is formed,
the width of said web in a base area being equal to at least a fifteenth of a circumference of the plastic dowel,
said web crossing the projection of the first holding section and
an apex face of said web extending at most to an imagined prolongation of the envelope of the shank section.

9. The plastic dowel according to claim 8, wherein two or more webs are provided which are arranged at same angular intervals about the longitudinal axis of the plastic dowel.

10. The plastic dowel according to claim 1, wherein in an area of a first holding section a groove-shaped recess extending in a longitudinal direction of the plastic dowel is formed in an inner circumferential face.

11. The plastic dowel according to claim 10, wherein the recess is formed in an area of a web, the web provided in each case on the outer side of the plastic dowel.

12. The plastic dowel according to claim 1, wherein a recess intersects the internal thread.

13. A combination of a rail screw and a plastic dowel formed according to claim 1, wherein the rail screw has a screw head and a threaded screw shank following the screw head in a longitudinal direction of the rail screw, a circulating screw thread being formed on said screw shank, wherein an upper flank of the screw thread is orientated at an angle of 90°±3° in relation to a longitudinal axis of the rail screw.

14. The combination according to claim 13, wherein the upper flank is orientated at an angle of 90°±1° in relation to the longitudinal axis of the rail screw.

15. The combination according to claim 13, wherein a core of the rail screw tapers conically towards a screw tip, at least in an area in which the screw thread is present.

16. The combination according to claim 13, wherein the screw thread extends over an entire length of the screw shank in a radial direction as far as a cylindrically formed envelope of the screw shank.

17. The combination according to claim 13, wherein, between the screw head and the thread section, the rail screw has a shank section whose circumferential face is smooth.

18. The combination according to claim 13, wherein an envelope of a circumferential face of the shank section coincides with a cylindrical envelope of the thread section.

\* \* \* \* \*